US012678930B2

(12) United States Patent (10) Patent No.: US 12,678,930 B2
Foster et al. (45) Date of Patent: Jul. 14, 2026

(54) TREE PRUNER ROPE AND ROPE HANDLE STORAGE

(71) Applicant: WOODLAND TOOLS, INC., Madison, WI (US)

(72) Inventors: Charlton G. A. Foster, Middleton, WI (US); James W. Meiller, Fitchburg, WI (US)

(73) Assignee: WOODLAND TOOLS, INC., Madison, WI (US)

( * ) Notice: Subject to any disclaimer, the term of this patent is extended or adjusted under 35 U.S.C. 154(b) by 574 days.

(21) Appl. No.: 18/172,795

(22) Filed: Feb. 22, 2023

(65) Prior Publication Data

US 2024/0051112 A1 Feb. 15, 2024

Related U.S. Application Data

(60) Provisional application No. 63/398,147, filed on Aug. 15, 2022.

(51) Int. Cl.
| | |
|---|---|
| *B25G 1/08* | (2006.01) |
| *A01G 3/08* | (2006.01) |
| *F16G 11/10* | (2006.01) |
| *B25G 1/04* | (2006.01) |

(52) U.S. Cl.
CPC ................ *B25G 1/08* (2013.01); *A01G 3/08* (2013.01); *F16G 11/103* (2013.01); *B25G 1/04* (2013.01)

(58) Field of Classification Search
CPC .... B25G 1/08; B25G 1/04; A01G 3/08; F16G 11/103
See application file for complete search history.

(56) References Cited

U.S. PATENT DOCUMENTS

| | | | | | |
|---|---|---|---|---|---|
| 884,256 | A | * | 4/1908 | Addie | A47G 33/105 |
| | | | | | 24/339 |
| D208,105 | S | * | 7/1967 | Haber | D8/395 |
| 3,521,332 | A | * | 7/1970 | Kramer | F16L 3/13 |
| | | | | | 248/912 |
| D270,329 | S | * | 8/1983 | Hardy | D8/356 |
| 4,688,961 | A | * | 8/1987 | Shioda | F16B 7/04 |
| | | | | | 24/339 |
| 4,707,892 | A | * | 11/1987 | Nelson | F16B 7/0433 |
| | | | | | 24/336 |
| D295,725 | S | * | 5/1988 | Shioda | D8/380 |
| D298,739 | S | * | 11/1988 | Richards, Jr. | D8/395 |

(Continued)

OTHER PUBLICATIONS

Amazon Listing for Corona Black Handle with reviews in 2020 (Year: 2020).*

(Continued)

*Primary Examiner* — Claude J Brown

(74) *Attorney, Agent, or Firm* — Charles S. Sara; Yanjun Ma; DeWitt LLP

(57) ABSTRACT

A rope and rope handle storage device comprising a looped body mounted on a pole, and a pair of attachment barbs attached to one side of the looped body. The attachment barbs are configured to have a space between them that can hold a rope or a securing piece attached to a rope handle. The rope and rope handle storage device stores the rope by clipping the rope into the space between the attachment barbs, and stores the rope handle by clipping the securing piece attached to the rope handle into the space between the attachment barbs.

10 Claims, 7 Drawing Sheets

(56)                References Cited

U.S. PATENT DOCUMENTS

| | | | | | |
|---|---|---|---|---|---|
| 4,787,660 | A | * | 11/1988 | Mrazek | F16G 11/103 |
| | | | | | 116/DIG. 1 |
| 5,005,793 | A | * | 4/1991 | Shillington | A61M 5/1418 |
| | | | | | 248/912 |
| D347,164 | S | * | 5/1994 | Wodka | D8/395 |
| 5,309,604 | A | * | 5/1994 | Poulsen | F16L 3/223 |
| | | | | | 24/339 |
| 5,316,247 | A | * | 5/1994 | Wodka | F16L 3/06 |
| | | | | | 248/68.1 |
| D363,017 | S | * | 10/1995 | Noble | D9/434 |
| D363,211 | S | * | 10/1995 | Noble | D9/434 |
| 5,544,783 | A | * | 8/1996 | Conigliaro | B65D 83/303 |
| | | | | | D9/434 |
| 5,642,557 | A | * | 7/1997 | Clews | E04B 2/7442 |
| | | | | | 52/285.3 |
| D391,636 | S | * | 3/1998 | Zwerk | D24/128 |
| D394,096 | S | * | 5/1998 | Edgar | D22/108 |
| 5,772,166 | A | * | 6/1998 | Adams | F21V 21/08 |
| | | | | | 248/229.16 |
| 5,806,452 | A | * | 9/1998 | Benoit | F16G 11/103 |
| | | | | | 114/218 |
| 5,806,669 | A | * | 9/1998 | Kim | B65D 83/285 |
| | | | | | 206/349 |
| 5,836,055 | A | * | 11/1998 | Cooper | A45D 40/00 |
| | | | | | 24/339 |
| 5,987,710 | A | * | 11/1999 | Paul | F16G 11/103 |
| | | | | | 24/130 |
| 6,094,783 | A | * | 8/2000 | Parsons | F16G 11/14 |
| | | | | | 24/130 |
| 6,158,095 | A | * | 12/2000 | Lassiter | F16L 3/237 |
| | | | | | 24/339 |
| 6,163,936 | A | * | 12/2000 | Benoit | F16G 11/103 |
| | | | | | 24/135 R |
| D438,453 | S | * | 3/2001 | Nelson | D8/395 |
| D440,005 | S | * | 4/2001 | Blanton | 24/3.12 |
| D479,798 | S | * | 9/2003 | Wall | D8/382 |

| | | | | | |
|---|---|---|---|---|---|
| D479,983 | S | * | 9/2003 | Wall | D8/382 |
| D508,842 | S | * | 8/2005 | Paolini | D8/395 |
| 6,942,532 | B2 | * | 9/2005 | Snyder | B63B 32/73 |
| | | | | | 441/75 |
| 7,025,012 | B1 | * | 4/2006 | Pecharich | B63B 21/045 |
| | | | | | 248/74.5 |
| D578,383 | S | * | 10/2008 | Adams | D8/367 |
| 7,866,273 | B2 | * | 1/2011 | Schlotterback | B63B 21/08 |
| | | | | | 24/130 |
| D660,690 | S | * | 5/2012 | Mixides | D8/396 |
| 8,191,840 | B2 | * | 6/2012 | Jenestreet | F21V 21/116 |
| | | | | | 24/20 R |
| D704,769 | S | * | 5/2014 | Penington | D19/81 |
| D732,009 | S | * | 6/2015 | Bak | D8/396 |
| D739,853 | S | * | 9/2015 | Lee | D14/253 |
| 11,835,164 | B2 | * | 12/2023 | George-Fowler | F16L 3/1058 |
| 11,944,084 | B1 | * | 4/2024 | Norbits | A01K 97/06 |
| 11,957,865 | B2 | * | 4/2024 | Ritter | A61M 39/284 |
| 2006/0207235 | A1 | * | 9/2006 | Izatt | A01D 34/4168 |
| | | | | | 56/13.7 |
| 2008/0011907 | A1 | * | 1/2008 | Jacobsma | F16L 33/035 |
| | | | | | 248/62 |
| 2008/0184619 | A1 | * | 8/2008 | Heighton | A01G 9/28 |
| | | | | | 47/33 |
| 2008/0256761 | A1 | * | 10/2008 | Bukoski | H02G 3/30 |
| | | | | | 24/129 R |
| 2009/0306574 | A1 | * | 12/2009 | Kopperschmidt | A61M 5/1418 |
| | | | | | 604/6.16 |
| 2015/0306305 | A1 | * | 10/2015 | Kluttz | A61M 5/1418 |
| | | | | | 248/219.4 |
| 2018/0319207 | A1 | * | 11/2018 | Pippus | B44D 3/123 |

OTHER PUBLICATIONS

Corona Clipper Rope on Black Handle TP 6870 TP6830 TP 6850 (Year: 2020).*

* cited by examiner

TREE PRUNER ROPE AND ROPE HANDLE STORAGE

CROSS-REFERENCE TO RELATED APPLICATION

The application claims priority to U.S. provisional application Ser. No. 63/398,147, filed Aug. 15, 2022, which is incorporated herein by reference in its entirety.

FIELD OF THE INVENTION

The present disclosure is directed to a rope and rope handle storage device that can be used for a tree pruner or other devices having poles and ropes.

BACKGROUND

Current tree pruners do not have a convenient way to store the rope and rope handle on existing products. This leads to end customer frustration of not having the rope and rope handle within reach to properly operate the tool, especially when the user extends the pole of the tree pruners. Thus, there is an unmet need in the art for a device to store the rope and rope handle and keep them within reach.

SUMMARY OF THE INVENTION

Disclosed herein is a rope and rope handle storage device that can be used for a tree pruner or other devices having poles and ropes. The rope and rope handle storage device 1 comprises:

a looped body 11 mounted on a pole 2; and a pair of attachment barbs 12 and 13 attached to one side of the looped body 11.

The looped body 11 is mounted on the pole 2 permanently or removably. In some embodiments, the looped body 11 has a pair of mounting tabs 14 and 15 at an opposite side of the attachment barbs 12 and 13, wherein the looped body 11 is mounted on the pole 2 by fastening the pair of mounting tabs 14 and 15.

The attachment barbs 12 and 13 are configured to have a space between them that can hold a rope 3, or a securing piece 41 attached to a rope handle 4. In some embodiments, the attachment barbs 12 and 13 each has a round-shaped tip 121 and 131 to assist holding the rope 3 or the securing piece 41 attached to the rope handle 4.

In one version of the present disclosure, the rope and rope handle storage device 1 stores the rope 3 by clipping the rope 3 into the space between the attachment barbs 12 and 13.

In another version of the present disclosure, the rope and rope handle storage device 1 stores the rope handle 4 by clipping the securing piece 41 attached to the rope handle 4 into the space between the attachment barbs 12 and 13. In some embodiments, one or more securing pieces 41 are attached to the rope handle 4. In some embodiments, the rope handle 4 comprises a hole 43 at a rear side thereof and a slot 42 at a front side thereof, wherein the rope 3 enters the rope handle 4 through the hole 43 and penetrates to the front side of the rope handle 4. The rope handle 4 further comprises gripping barbs 44 inside the slot 42. The rope 3 is held into the rope handle 4 by pulling the rope 3 into the slot 42 to be gripped by the gripping barbs 44. The rope 3 is released from the rope handle 4 by pulling the rope 3 out of the slot 42 to allow adjustment of the rope 3.

The objects and advantages of the disclosure will appear more fully from the following detailed description of the preferred embodiment of the disclosure made in conjunction with the accompanying drawings.

DETAILED DESCRIPTION OF THE INVENTION

Figure 1:
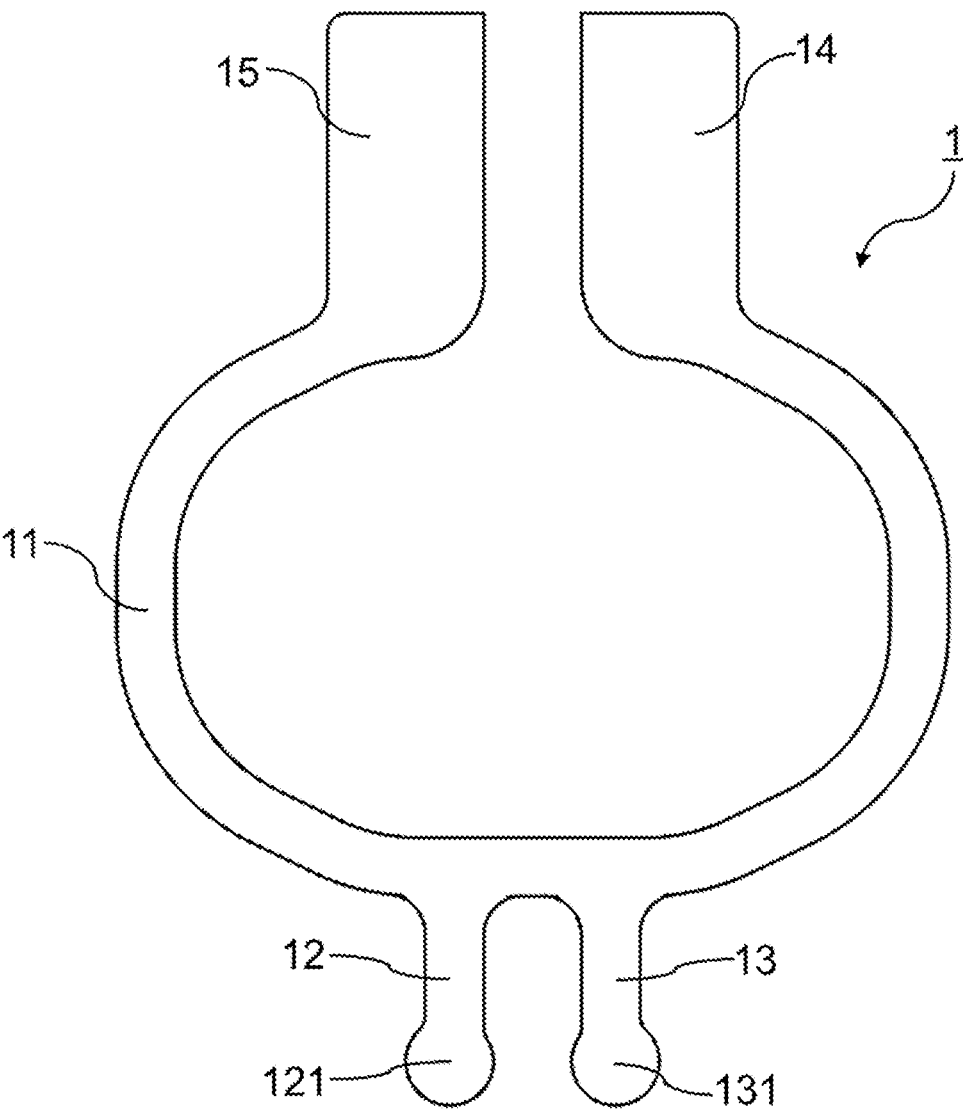
FIG. 1 is a top view of a rope and rope handle storage device according to a preferred embodiment of the present disclosure.

Referring to FIGS. 1-7, a preferred embodiment of the present disclosure includes a rope and rope handle storage device 1 comprising a looped body 11 and a pair of attachment barbs 12 and 13 attached to one side of the looped body 11. The looped body 11 is mounted on a pole 2 permanently or removably. Any mounting methods known in the art are contemplated to be useful herein. For example, the looped body 11 can be glued, riveted, or molded onto the pole 2. In the exemplary embodiment shown in FIGS. 1-4, the looped body 11 has a pair of mounting tabs 14 and 15 at an opposite side of the attachment barbs 12 and 13. The looped body 11 is mounted on the pole 2 by fastening the mounting tabs 14 and 15, such as using a screw 16 that penetrates the mounting tabs 14 and 15.

The attachment barbs 12 and 13 are configured to have a space between them that can hold a rope 3 or a securing piece 41 attached to a rope handle 4. In preferred embodiments as shown in FIG. 1, the attachment barbs 12 and 13 each has a round-shaped tip 121 and 131 to assist holding the rope 3 or the securing piece 41 attached to the rope handle 4.

Figure 2:
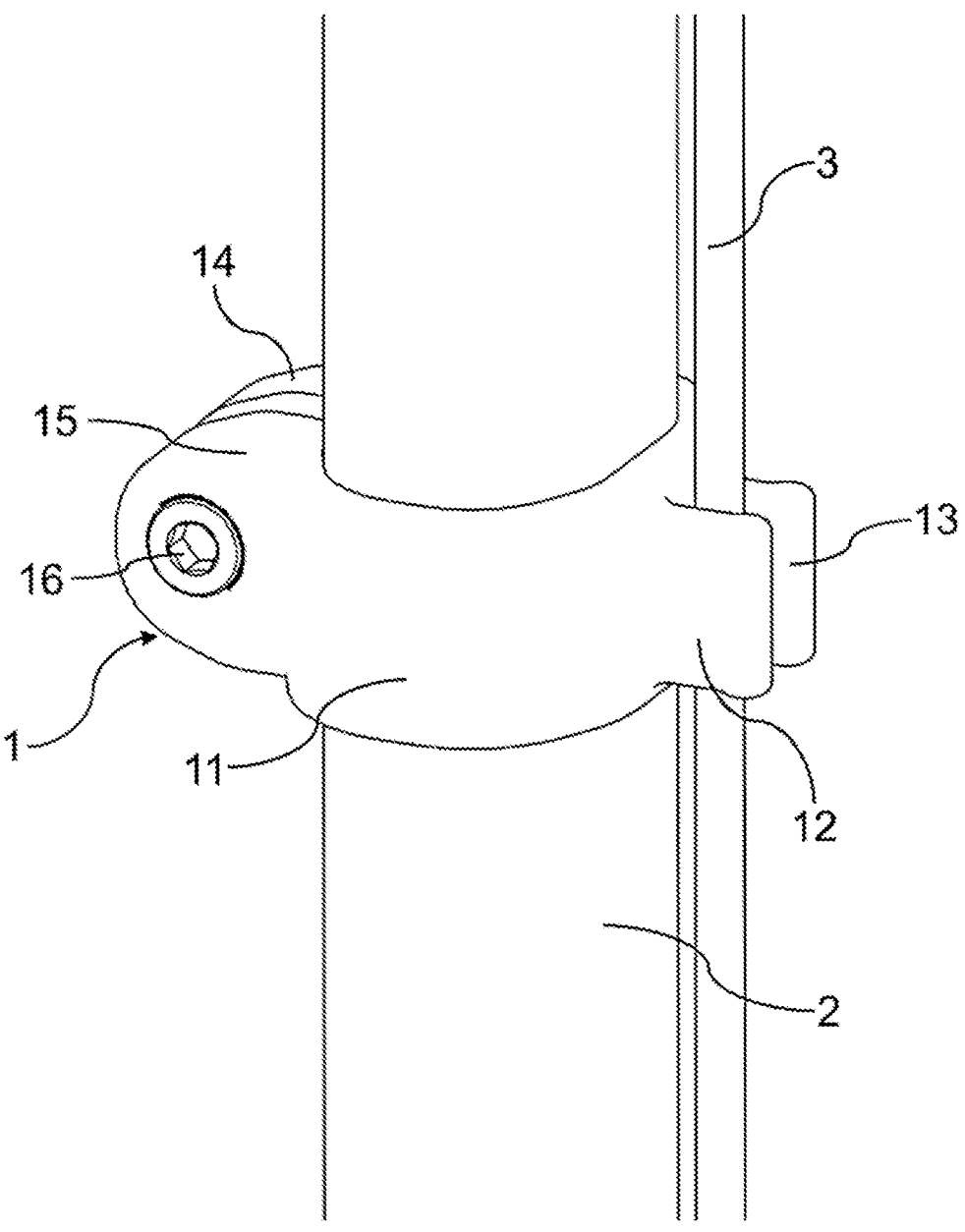
FIG. 2 is a perspective view of the rope and rope handle storage device that stores a rope, according to the preferred embodiment of the present disclosure.

In one version of the present disclosure as shown in FIG. 2, the rope and rope handle storage device 1 can store the rope 3 by clipping the rope 3 into the space between the attachment barbs 12 and 13, such that the rope 3 is held within reach of the user. As needed, the rope 3 is easily detached from the rope and rope handle storage device 1 by pulling the rope 3 out of the space between the attachment barbs 12 and 13.

Figure 3:
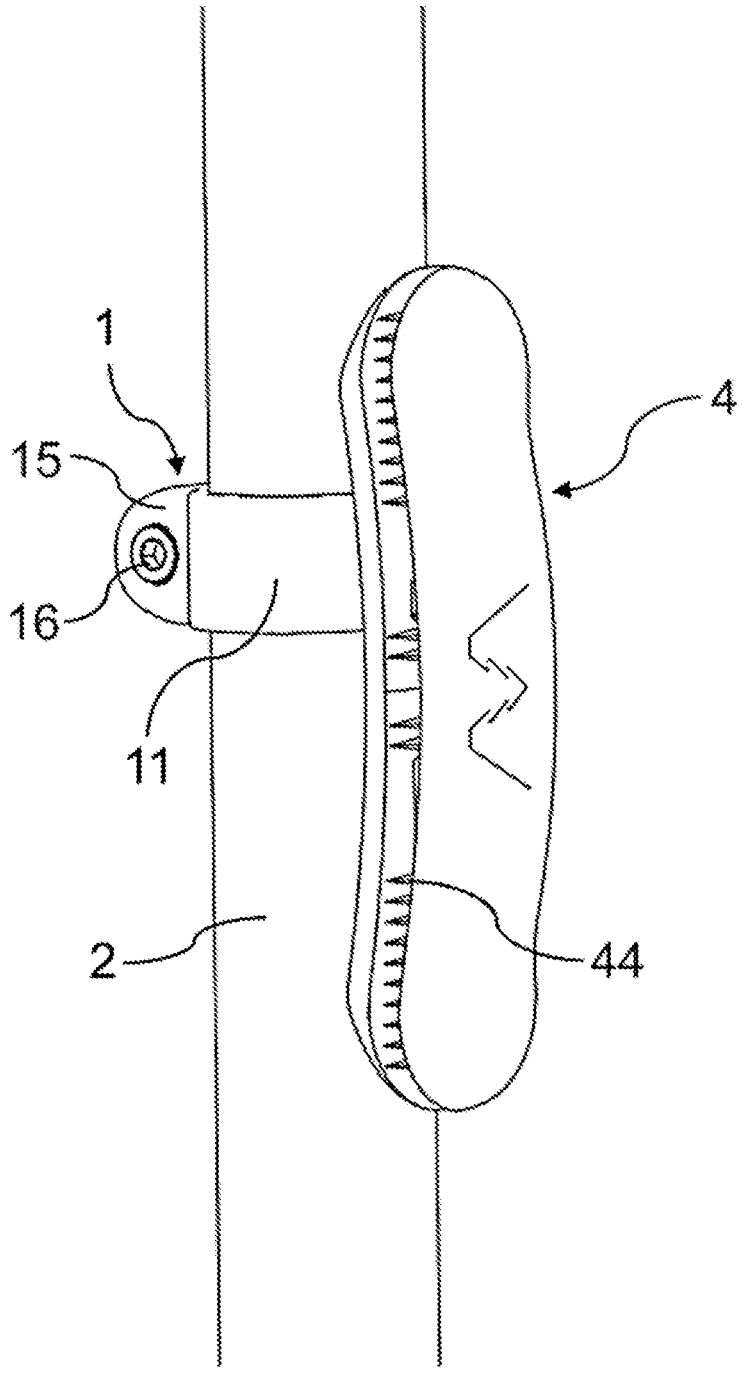
FIG. 3 is a perspective view of the rope and rope handle storage device that stores a rope handle, when the rope handle is attached to the storage device, according to the preferred embodiment of the present disclosure.
Figure 4:
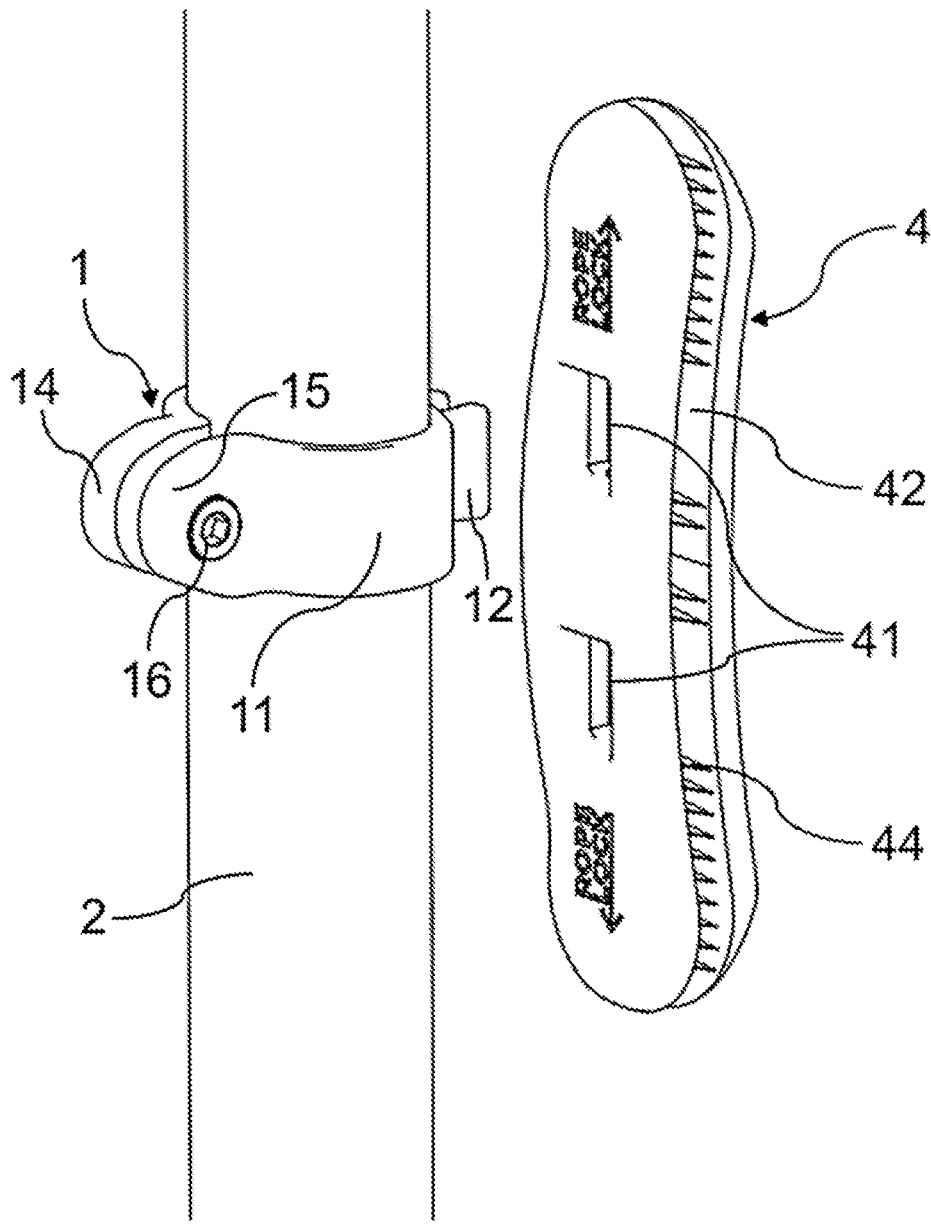
FIG. 4 is a perspective view of the rope and rope handle storage device that stores a rope handle, when the rope handle is detached from the storage device, according to the preferred embodiment of the present disclosure.
Figure 5:
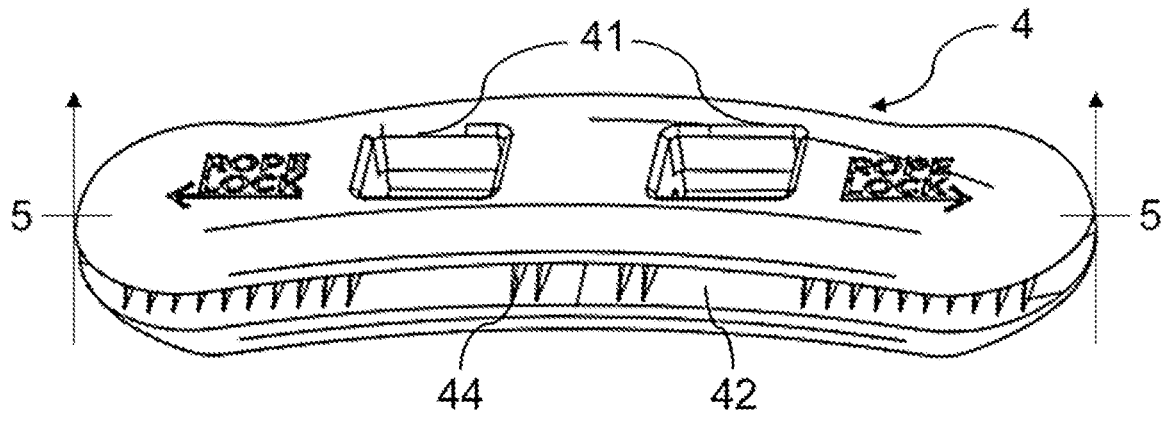
FIG. 5 is a schematic view of a rope handle (top) and a cross-section view (bottom) taken at lines 5-5, according to the preferred embodiment of the present disclosure.
Figure 5:
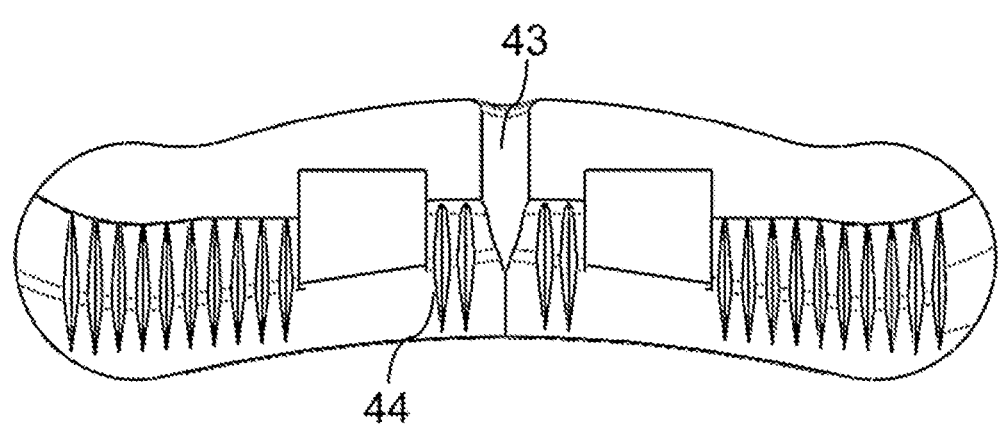

In another version of the present disclosure as shown in FIGS. 3-4, the rope and rope handle storage device 1 can store the rope handle 4 by clipping the securing piece 41 attached to the rope handle 4 into the space between the attachment barbs 12 and 13, such that the rope 3 held by the rope handle 4 is within reach of the user. As needed, the rope handle 4 can be easily detached from the rope and rope handle storage device 1 by pulling the securing piece 41 out of the space between the attachment barbs 12 and 13.

Figure 6:
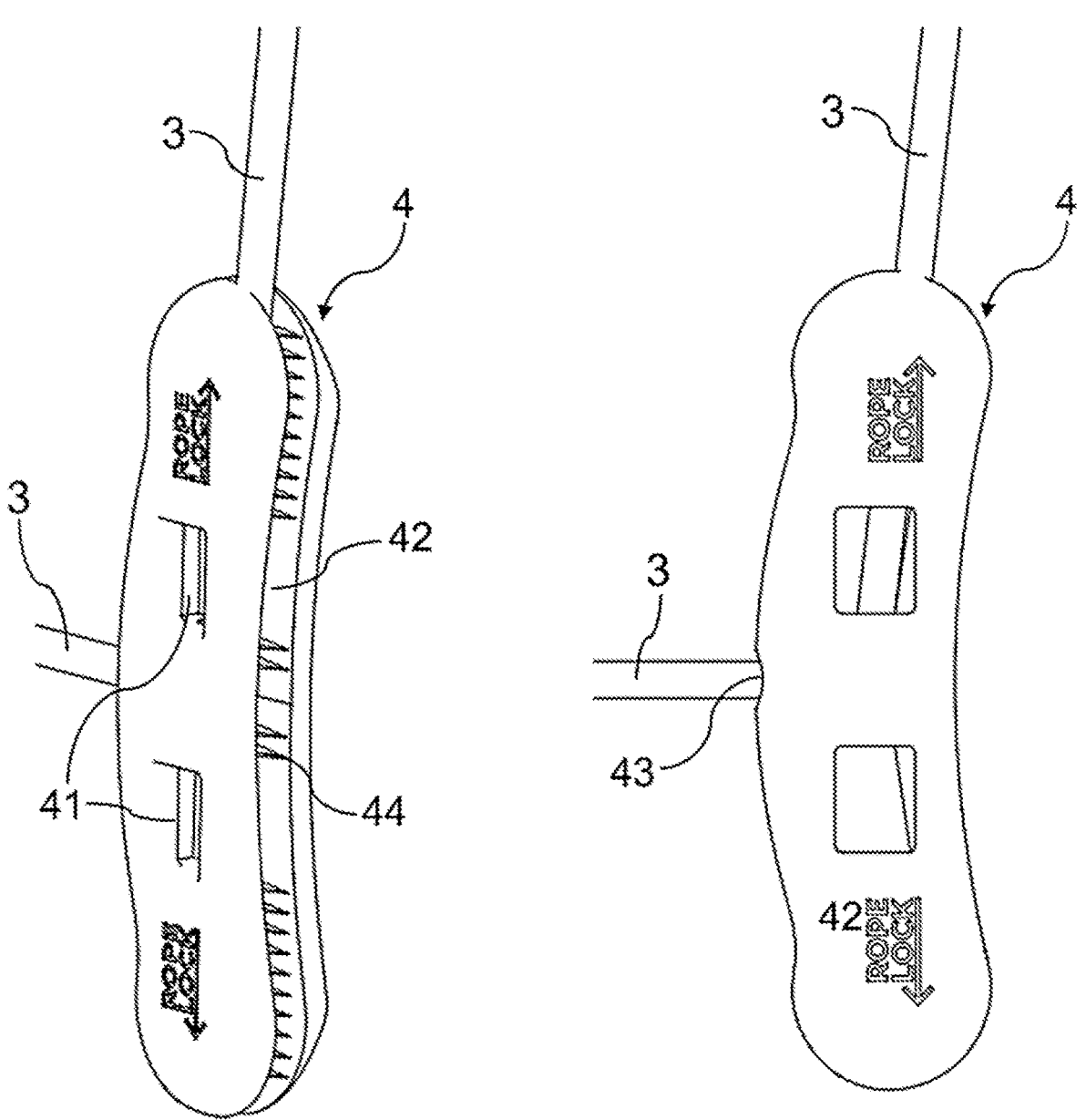
FIG. 6 is a perspective view (left) and a side view (right) of the rope handle when the rope is in tight status, according to the preferred embodiment of the present disclosure.
Figure 7:
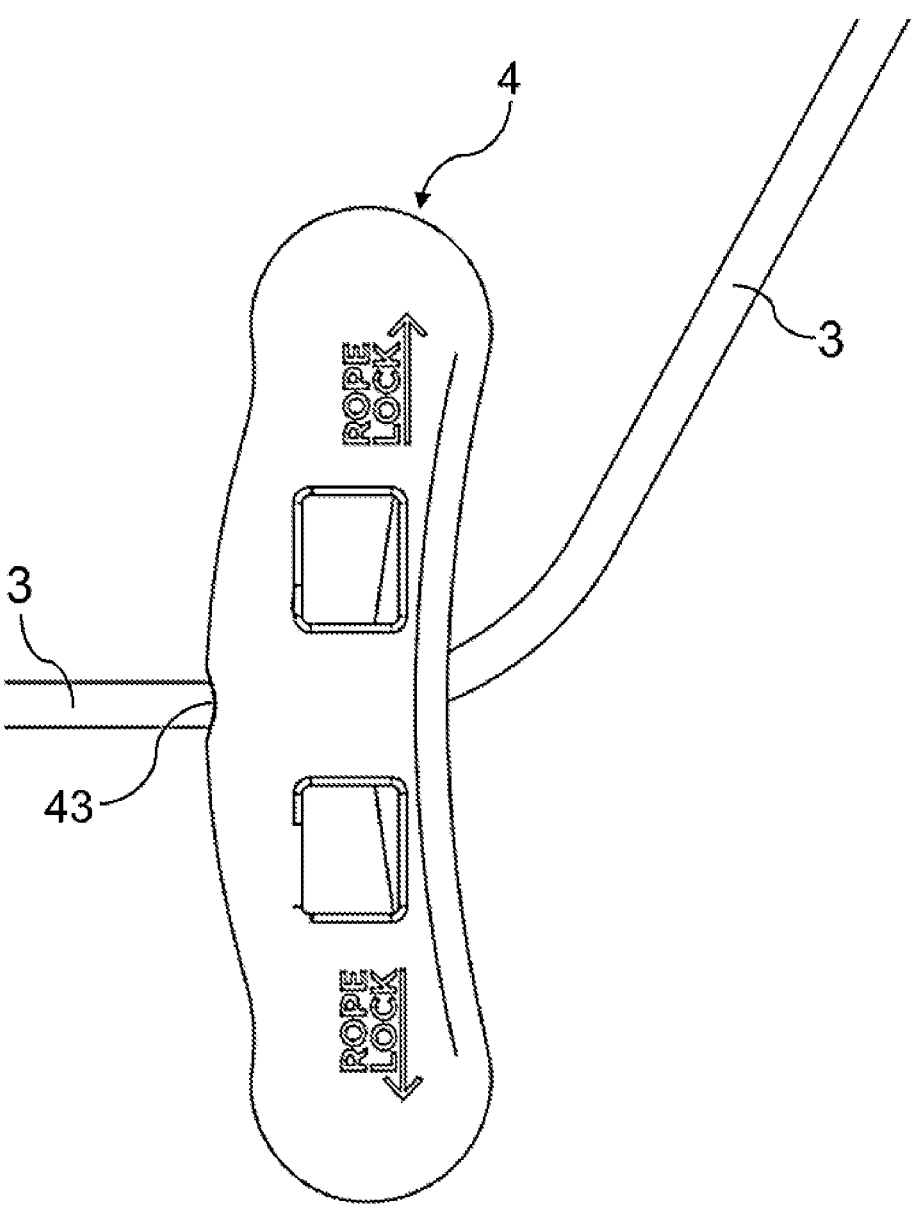
FIG. 7 is a side view of the rope handle when the rope is in loose status, according to a preferred embodiment of the present disclosure.

The rope handle 4 can have one or more securing pieces 41 attached. For example, one, two, three, or four securing pieces 41 may be attached to the rope handle 4, on the same side or different sides thereof. The rope handle 4 can be manufactured to any configuration that allows holding the rope 3 and adjusting the length of the rope 3 as needed. In the exemplary embodiment as shown in FIGS. 3-7, the rope handle 4 comprises a hole 43 at a rear side thereof and a slot 42 at a front side thereof. The rope 3 enters the rope handle 4 through the hole 43 and penetrates to the front side of the rope handle 4. The rope handle 4 further comprises gripping barbs 44 inside the slot 42. When the rope 3 is pulled into the slot 42, the gripping barbs 44 grip the rope 3 to hold it tightly and prevent it from sliding (FIG. 6). The rope 3 is then easily released from the rope handle 4 by pulling the rope 3 out of the slot 42 and can be quickly adjusted to a new length (FIG. 7).

All the components of the rope and rope handle storage device 1 can be manufactured by any materials that are suitable for endurable use. The shape and dimension of each component can vary from the preferred embodiments shown herein within the scope of the disclosure.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations and systems described herein may be used alone or in combination with other configurations and systems. It is to be expected that various equivalents, alternatives and modifications are possible within the scope of the foregoing description.

Any version of any component of the disclosure may be used with any other component of the disclosure. The elements described herein can be used in any combination whether explicitly described or not.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

The systems of the present disclosure can comprise, consist of, or consist essentially of the essential elements and limitations described herein, as well as any additional or optional components, or limitations described herein or otherwise useful in the art. The disclosure provided herein suitably may be practiced in the absence of any element which is not specifically disclosed herein.

While this disclosure may be embodied in many forms, what is described in detail herein is a specific preferred embodiment of the disclosure. The present disclosure is an exemplification of the principles of the disclosure is not intended to limit the disclosure to the particular embodiments illustrated. It is to be understood that this disclosure is not limited to the particular examples, configurations, and materials disclosed herein as such configurations and materials may vary somewhat. It is also understood that the terminology used herein is used for the purpose of describing particular embodiments only and is not intended to be limiting since the scope of the present disclosure will be limited to only the appended claims and equivalents thereof

What is claimed is:

1. A rope and rope handle storage device comprising:
a looped body mounted on a pole; and
a pair of attachment barbs attached to one side of the looped body,
wherein each attachment barb comprises a straight projection extending outwardly from the looped body and terminating in a rounded distal end;
wherein the attachment barbs have a space between them configured to interchangeably receive each of a rope and a securing piece attached to a rope handle; and
wherein the rounded distal ends are configured to assist retaining the rope or the securing piece within the space.

2. The rope and rope handle storage device of claim 1, wherein the looped body is mounted on the pole removably.

3. The rope and rope handle storage device of claim 1, wherein the looped body has a pair of mounting tabs at an opposite side of the attachment barbs, wherein the looped body is mounted on the pole by fastening the pair of mounting tabs.

4. The rope and rope handle storage device of claim 1, wherein the rope and rope handle storage device stores the rope by clipping the rope into the space between the attachment barbs.

5. The rope and rope handle storage device of claim 1, wherein the rope and rope handle storage device stores the rope handle by clipping the securing piece attached to the rope handle into the space between the attachment barbs, wherein the securing piece is located on an outer surface of the rope handle.

6. The rope and rope handle storage device of claim 5, wherein one or more securing pieces are attached to the rope handle.

7. The rope and rope handle storage device of claim 5, wherein the rope handle comprises a hole at a rear side thereof and a slot at a front side thereof, wherein the rope enters the rope handle through the hole and penetrates to the front side of the rope handle.

8. The rope and rope handle storage device of claim 7, wherein the rope handle further comprises gripping barbs inside the slot, and the rope is held into the rope handle by pulling the rope into the slot to be gripped by the gripping barbs.

9. The rope and rope handle storage device of claim 8, wherein the rope is released from the rope handle by pulling the rope out of the slot to allow adjustment of the rope.

10. The rope and rope handle storage device of claim 1, wherein the looped body is mounted on the pole permanently.

* * * * *